United States Patent
Watanabe (10) Patent No.: US 6,407,544 B1
(45) Date of Patent: Jun. 18, 2002

(54) METHOD AND APPARATUS FOR TESTING A PLURALITY OF MAGNETIC HEAD DEVICES OPPOSING A COMMON SURFACE OF A MAGNETIC DISK

(75) Inventor: Makoto Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/632,577

(22) Filed: Aug. 4, 2000

(30) Foreign Application Priority Data

Aug. 6, 1999 (JP) .................................... 11-223531

(51) Int. Cl.[7] .............................................. G01R 33/12
(52) U.S. Cl. ................................. 324/210; 360/31
(58) Field of Search ................................ 324/210, 211, 324/212, 262, 537; 360/30, 31, 105

(56) References Cited

U.S. PATENT DOCUMENTS 5,479,098 A * 12/1995 Yokomaya et al. .......... 324/212
6,204,660 B1 * 3/2001 Lee ............................. 324/212

* cited by examiner

Primary Examiner—Edward Lefkowitz
Assistant Examiner—Subhash Zaveri
(74) Attorney, Agent, or Firm—Brinks Hofer Gilson & Lione (57) ABSTRACT

A plurality of magnetic head devices are placed on different scanning regions in the radial direction of a disk-shaped recording medium. Each scanning region is slightly displaced from each of the other scanning regions in the radial direction of the recording medium. The plurality of magnetic head devices is tested.

11 Claims, 7 Drawing Sheets

METHOD AND APPARATUS FOR TESTING A PLURALITY OF MAGNETIC HEAD DEVICES OPPOSING A COMMON SURFACE OF A MAGNETIC DISK

BACKGROUND OF THE INVENTION

1. Field of the Invention

The present invention relates to a method and an apparatus for testing in a manufacturing process a plurality of magnetic head devices each having a magnetic head ford recording and reading used in a hard disk, for example. More particularly, the present invention relates to a method and an apparatus for testing a plurality of magnetic head devices, which can improve testing efficiency by testing a plurality of magnetic head devices Simultaneously.

2. Description of the Related Art

Figure 9:
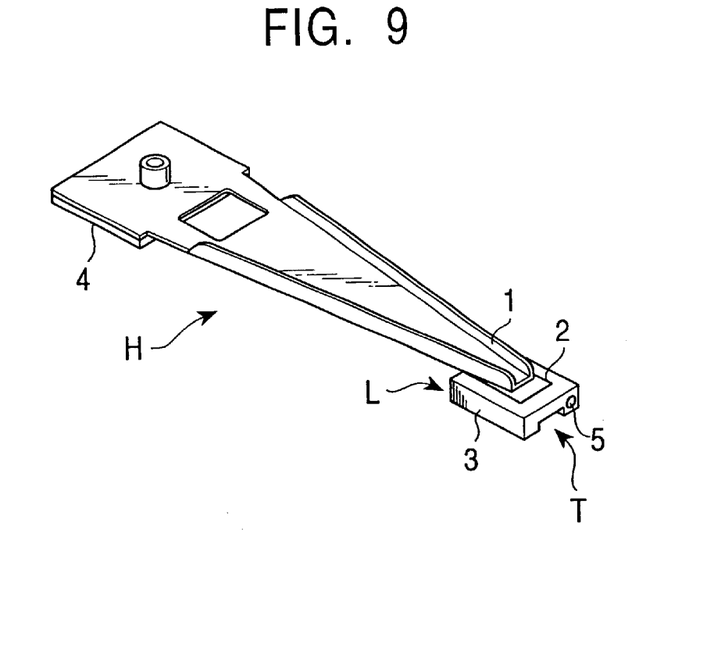
FIG. 9 is a perspective view of a magnetic head device according to the prior art.

FIG. 9 is a perspective view showing a magnetic head device according to the prior art. The magnetic head device H is provided with a flexure 2 at an end of a load beam (supporting member) 1. A magnetic head 3 is supported through the flexure 2. The load beam 1 and the flexure 2 are flexible supporting members formed with a flat spring or the like. A mount board 4 is molded at a basal end of the load beam 1.

Recording and reading function portions 5 are provided in a trailing side end portion T of the magnetic head 3.

The magnetic head 3 levitates with a tilt attitude caused by a leading side end portion L, which receives air flow above a disk as a recording device when the disk turns and is lifted from a surface of the disk. When the disk stops, the magnetic head 3 touches on the disk.

The recording and reading function portions 5 of the magnetic head device H includes an MR type thin film reading element, which uses a magnetic resistance effect, as its reading function portion, and an inductive type thin film recording element as its recording function portion, for example.

The magnetic head device H is tested with respect to recording and reading characteristics after its assembly is completed.

Figure 10:
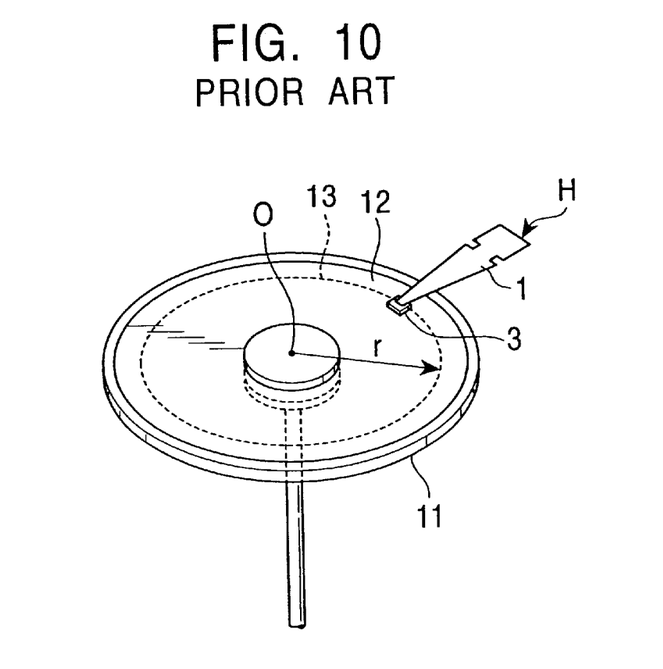
FIG. 10 is a perspective view for showing a conventional testing apparatus according to the prior art.

FIG. 10 is a perspective view for describing a conventional method for testing the magnetic head device H according to the prior art.

A disk-shaped recording medium 12 is held on a driver 11 and is rotationally driven. The magnetic head device H is tested with respect to recording and reading characteristics on the recording medium 12 by causing the magnetic head 3 to perform recording/reading.

The conventional method for testing a magnetic head device shown in FIG. 10 has disadvantage that only one magnetic head can be tested at a time.

When the magnetic head device H is tested, a radial position from a center O of the recording medium 12 to a scanning region f the recording and reading function portions 5 (see FIG. 9) of the magnetic head 3 is set at a predetermined position for the test in order to have an equal recording/reading condition for the magnetic head device H.

For example, in FIG. 10, the scanning region of the recording and reading function portions 5 of the magnetic head 3 is positioned on a circumference of a radius r on the recording medium 12.

When a plurality of magnetic head devices are placed on arbitrary and different radial positions, various conditions of each of the magnetic head devices, such as a skew angle, relative traveling speed, and others for the recording medium 12 are varied. Consequently, each of the magnetic head devices cannot be tested under equal conditions.

Also, a plurality of magnetic head devices could be located such that a scanning region of recording and reading function portions of each of the magnetic heads is positioned on a circumference of a radius r on the recording medium 12. However, such a method cannot be adopted.

When recording/reading characteristics of the magnetic head device H is tested in FIG. 10, a test write signal is recorded by scanning on the circumference of the radius r on the recording medium 12 through the recording function portion of the magnetic head 3. Then, the test write signal is read by the reading function portion of the magnetic head 3 in order to analyze a waveform of a read signal and determine whether the recording/reading characteristics of the magnetic head device H reach to a quality standard of a certain product or not.

Therefore, while one magnetic head device is scanning and recording/reading on a circumference of a radius r on the recording medium 12 while another magnetic head device is scanning and recording/reading on the circumference of the radius r on the recording medium 12, a problem arises that each of the magnetic head devices cannot perform recording/reading with reliability. The magnetic head devices may be reading the write signals recorded of the other magnetic head devices. The magnetic head devices may over write the write signals recorded by other magnetic head devices.

SUMMARY OF THE INVENTION

The present invention is made for overcoming the above-described problem of the related art. It is an object of the present invention to provide a method and an apparatus for testing a magnetic head device, which can improve testing efficiency by testing a plurality of magnetic head devices simultaneously.

According to a first aspect of the present invention, a method for testing a plurality of magnetic head devices is provided. Each magnetic head device comprises a supporting member and a magnetic head having a recording function portion and a reading function portion at an end of the supporting member. The method the steps of placing the plurality of magnetic head devices on different scanning regions in the radial direction of a disk-shaped recording medium, each of scanning regions being slightly displaced from each other in the radial direction of the recording medium; turning the disk-shape recording medium to record a magnetic signal on the recording medium and to read the recorded magnetic signal through each of the plurality of magnetic head devices; and evaluating the plurality of magnetic head devices simultaneously through the read signal.

When the plurality of magnetic head devices are tested, each of the scanning region in the radial direction is predetermined. However, in a real test, tolerances in a certain range is allowed in the radial position.

Therefore, even when magnetic heads of the plurality of magnetic head devices are placed on the recording medium simultaneously, the scanning regions of the recording function portion and the reading function portion of each magnetic head may be held within a certain range of tolerances. Thus, various conditions such as a skew angle and relative traveling speed of the respective magnetic head devices for the recording medium can fall in the tolerance range. At the same time, all of the magnetic head devices placed on the recording medium simultaneously can be tested under virtually equal testing conditions. Therefore, the plurality of magnetic head devices can be tested simultaneously and accurately, which provides a much more efficient testing process for a plurality of magnetic head devices.

Further, while at least one magnetic head device among the plurality of magnetic head devices is performing a recording operation on the recording medium, it is preferable that other magnetic heads are adjusted to wait in order not to perform a reading operation.

When each of all the magnetic head devices placed on the recording medium simultaneously is allowed to record and read in arbitrary timing, a condition occurs where one magnetic head device is performing a recording operation while the, other magnetic head device is performing a reading operation.

In the condition where one magnetic head device is performing a recording operation while the other magnetic head device is performing a reading operation, a write signal output by the magnetic head device performing a recording operation is transmitted to the other magnetic head device performing a reading operation, which causes noise. That is, crosstalk occurs between the plurality of magnetic head devices.

According to the present invention, while at least one magnetic head device among the plurality of magnetic head devices is performing a recording operation on the recording medium, other magnetic head devices are adjusted to wait in order not to perform a reading operation. As a result, the crosstalk can be prevented, and the plurality of magnetic head devices can be evaluated simultaneously and accurately.

Alternatively, all the plurality of magnetic head devices may be adjusted to perform a recording operation simultaneously in synchronization with a same timing signal. Then all the plurality of magnetic head devices may be adjusted to read simultaneously in synchronization with a same timing signal, for example. It can also prevent causing crosstalk among the plurality of magnetic head devices. That is, the plurality of magnetic head devices can be evaluated simultaneously and accurately.

When a plurality of magnetic head devices are placed on the recording medium, a radial interval between scanning regions on the recording medium where the recording function portions and the reading function portions of the plurality of magnetic head devices scan is preferably set to be spaced at about 100 μm or larger. Thus, it can prevent interference between each recording track formed on the recording medium by each of the plurality of magnetic head devices.

Further, a radial interval between the scanning regions where the recording function portions and the reading function portions of the plurality of magnetic head devices is preferably set within about 1% of a reference radius set in a radial middle of the plurality of scanning regions.

When a plurality of magnetic head devices are placed at different radial positions on the recording medium, various conditions of each of the magnetic head devices for the recording medium are varied such as a skew angle and a relative traveling speed.

However, if a radial interval between scanning regions of the recording medium where the recording function portions and the reading function portions of the plurality of magnetic head devices scan is set within about 1% of a reference radius set in a radial middle of the plurality of the scanning regions, the conditions such as a skew angle and a relative traveling speed can fall in the tolerance range for the test. As a result, each of the magnetic head devices clan be evaluated under virtually equal conditions.

It should be noted that the plurality of magnetic head devices may be located such that they are positioned on one straight line formed by each of their recording function portions and reading function portions, with passing through the center of the recording medium and extending radially. As a result, the evaluation can be performed with the skew angles of their respective magnetic head devices being equal.

Further, a holder to which a supporting member of the magnetic head device is mounted may be provided by two or more times of the number of magnetic head devices to be tested simultaneously. Then, while the plurality of magnetic head devices are being tested by turning the recording medium, exchanging magnetic head devices is preferably performed in the other holder which does not hold the magnetic head under test. That is, while the magnetic head devices are being exchanged, other magnetic head devices can be tested. Thus, the test of the magnetic head devices can be performed continuously, and its testing efficiency is improved.

An apparatus for testing a plurality of magnetic head devices according to a second aspect of the present invention includes a driver for turning a disk-shape recording medium for a test, a plurality of holders, each holding a supporting member of the magnetic head device having a magnetic head with a recording function portion and a reading function portion and the holding member for supporting it, and placing the plurality of magnetic head device on different scanning regions in the radial direction of the disk-shaped recording medium, each of the scanning regions being slightly displaced from each other in the radial direction of the recording medium, a write signal generator for generating and outputting a write signal to the recording function portion of the magnetic head, a controller for instructing the write signal generator to generate a write signal and instructing the reading function portion of the magnetic head to read a write signal, a timing generator for generating a timing signal for synchronization of recording and reading, and an analyzer for analyzing a read signal sent from the reading function portion of the magnetic head device to determine recording and reading characteristics of the magnetic head device. The controller instructs individual magnetic head devices to record/read alternately or simultaneously in synchronization with the timing signal.

It is preferable that the write signal generator, the controller and the analyzer are placed one each for one of the plurality of magnetic head devices facing onto the recording medium simultaneously. It is also preferable that a communication device is provided by which each of the controllers monitors other controllers such that the controller can instruct each of the magnetic head devices to perform recording/reading alternately or simultaneously.

Further, the controller can cause the individual magnetic head devices to record/read alternately. In that case, while at least one magnetic head device among the plurality of magnetic head devices placed on the recording medium simultaneously is performing a recording operation on the recording medium, the other magnetic head devices may be adjusted to wait in order not to perform a reading operation, for example.

Alternatively, the controller can cause the individual magnetic head devices to record/read simultaneously. In that case, all of the plurality of magnetic head devices placed on the recording medium simultaneously may be adjusted to perform a recording operation simultaneously in synchronization with a same timing signal, for example, and then, after the recording operation, to perform a reading operation simultaneously in synchronization with a same timing signal, for example.

Preferably, the position of the holder is set such that radial intervals of scanning regions where the recording function portions and the reading function portions of the plurality of magnetic head devices scan a recording medium are spaced 100 μm or larger. It can prevent that recording tracks formed on the recording medium by each of the plurality of magnetic head devices interfere with each other.

Preferably, the position of the holder is set such that radial intervals of scanning regions where the recording function portions and the reading function portions of the plurality of magnetic head devices scan a recording medium are within about 1% of a reference radius set in a radial middle of the plurality of scanning regions.

When a plurality of magnetic head devices are placed at different radial positions on the recording medium, various conditions are varied such as a skew angle and relative traveling speed of each magnetic head for the recording medium.

However, when positions of holders are set such that radial intervals of scanning regions where the recording function portions and the reading function portions of the plurality of magnetic head devices scan a recording medium are within about 1% of a reference radius set in a radial middle of the plurality of scanning regions, the conditions such as the skew angle and the relative travelling speed can fall in the tolerance range for the test. Thus, each of the magnetic head devices can be tested under virtually equal conditions.

It should be noted that the plurality of magnetic head devices may be located such that they are positioned on one straight line formed by each of their recording function portions and reading function portions, with passing through the center of the recording medium and extending radially. As a result, the test can be performed with the skew angle of their respective magnetic head devices being equal.

Further, the holder may be provided by two or more times of the number of magnetic head devices to be tested simultaneously. Then, while the recording medium is being turned to test the plurality of magnetic head devices, exchanging the magnetic head devices may be preferably performed in the other holder, which does not hold the magnetic head under test. Thus, since the test does not have to be stopped for the exchange of the magnetic head devices, the test of the magnetic head devices can be performed continuously. Accordingly, the testing efficiency is improved.

According to the method and the apparatus for testing a plurality of magnetic head devices of the present invention described above, when a plurality of magnetic heads of the magnetic head devices are placed on the recording medium simultaneously and scanning regions of the recording medium in the radial direction fall in a certain range of tolerance, tests can be performed with conditions of the individual magnetic head devices, such as a skew angle and a relative traveling speed, for the recording medium being virtually equal.

Further, by adjusting the plurality of magnetic head devices to perform recording/reading alternately or simultaneously, a state can be avoided where one magnetic head device is performing a recording operation while the other magnetic head device is performing a reading operation.

As a result, a plurality of magnetic head devices can be tested simultaneously and accurately, which provides significantly efficient processes for testing magnetic head devices.

DETAILED DESCRIPTION OF THE PREFERRED EMBODIMENTS

Figure 1:
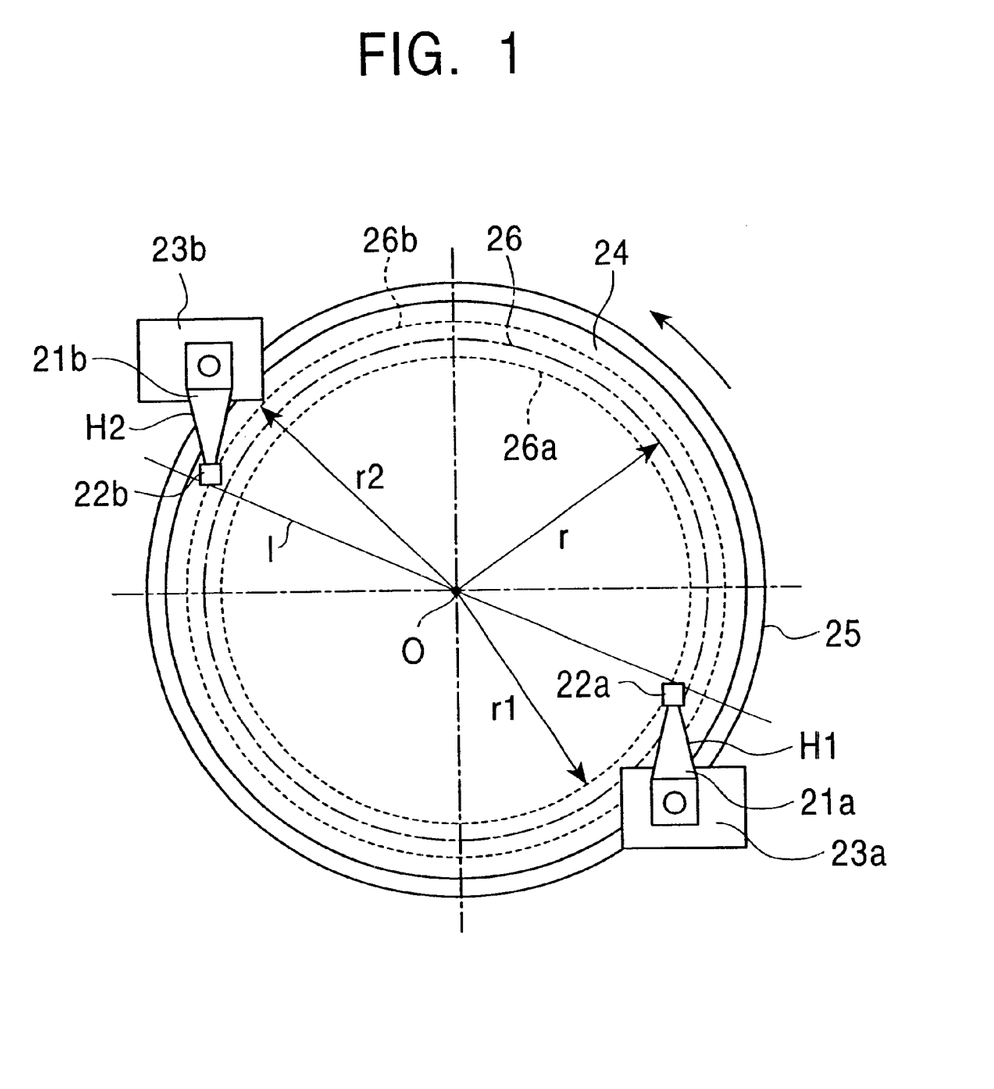
FIG. 1 is a plan view for showing an embodiment of a testing method of the present invention.

FIG. 1 is a plan view for showing an embodiment of a testing method according to the present invention.

A magnetic head device H1 to be tested includes a magnetic head 22a having a recording function portion and a reading function portion, which is supported at an end of a supporting member 21a. The magnetic head device H1 is faced onto a disk-shaped recording medium 24 with the supporting member 21a being mounted to a holding portion 23a as a holder.

A magnetic head device H2, which is to be tested at the same time as that of the magnetic head device H1, is held by a holding portion 23b and placed on the recording medium 24 in the vicinity of an opposite side of the magnetic head device H1 across a center O. In the magnetic head device H2, a magnetic head 22b having a recording function portion and a reading function portion is supported at an end of a supporting member 21b. The recording function portions and the reading function portions of the magnetic heads 22a and 22b are provided with an MR type thin film reading element, which uses a magnetic resistive effect, as the magnetic function portion, and an inductive type thin film recording element as the recording function portion, for example.

It should be noted that the magnetic head device H1 and the magnetic head device H2 may be the same as the magnetic head device H shown in FIG. 9.

Further, the holding portions 23a and 23b can move the magnetic head devices H1 and H2, respectively, in the radial direction of the recording medium 24.

The recording medium 24 is turned by a driver 25 in the direction indicated by an arrow.

In FIG. 1, the magnetic head device H1 and the magnetic head device H2 are placed such that scanning regions of the recording function portions and the reading function portions, of their respective magnetic heads 22a and 22b are sightly displaced from other.

A radial distance from the center O of the recording medium 24 to a scanning region 26a of the recording function portion and the reading function portion of the magnetic head 22a is r1. Also, a radial distance from the center O of the recording medium 24 to a scanning region 26b of the recording function portion and the reading function portion of the magnetic head 22b is r2. That is, the magnetic heads 22a and 22b of the magnetic head devices H1 and H2, which are faced onto the recording medium 24, form a recording track with the radius r1 and a recording track with the radius r2, respectively.

In this embodiment, r1 is equal to about 19.9 mm and r2 is equal to about 20.1 mm. A radial interval r2–r1 between the scanning regions 26a and 26b, where the recording function portions and the reading function portions of the magnetic heads 22a and 22b scan the recording medium 24 are set within about 1% of a reference radius r, which is equal to about 20 mm, set in a radial middle 26 between the scanning regions 26a and 26b.

Respective relative traveling speeds of the magnetic heads 22a and 22b with respect to the recording medium 24 are products of respective radiuses of the scanning regions 26a and 26b where their respective magnetic heads 22a and 22b scan the recording medium 24 and an angular speed of the recording medium 24. Therefore, if the radial interval r2–r1 between the scanning regions 26a and 26b, where the recording function portions and the reading function portions of the magnetic heads 22a and 22b scan the recording medium 24 is within about 1% of the reference radius r=20 mm set in the radial middle 26 between the scanning region 26a and the scanning region 26b, a difference in relative speed between the magnetic heads 22a, 22b and the recording medium while the magnetic heads 22a and 22b are scanning their respective scanning regions 26a and 26b is within about 1% of the relative speed with respect to the recording medium 24 when the magnetic heads 22a and 22b scan on a periphery of radius r. Therefore, conditions such as a relative travelling speed can fall in a tolerance range of the test, and the magnetic head devices H1 and H2 are tested under virtually equal conditions.

Further, if the radial interval r2–r1 between the scanning regions 26a and 26b is within about 1% of a reference radius r, which is equal to about 20 mm, which is set in the radial middle 26 between the scanning regions 26a and 26b, skew angles of the magnetic head devices H1 and H2 also fall in the tolerance range of the test. It means that the magnetic head devices H1 and H2 are tested under virtually equal conditions.

In FIG. 1, the magnetic head devices H1 and H2 are held by their respective holding portion 23a and holding portion 23b such that the recording function portions and the reading function portions of their respective magnetic heads 22a and 22b are positioned on one straight line 1 which passes through the center O of the recording medium 24 and extends radially. As a result, the skew angles of the magnetic head devices H1 and H2 are the same.

In this embodiment, the positions of the holders 23a and 23b are set such that the radial interval between scanning regions 26a and 26b where the recording function portions and the reading function portions of the magnetic heads 22a and 22b scan the recording medium is spaced 200 μm. It can prevent that recording tracks formed on the recording medium 24 by each of the magnetic head devices H1 and H2 interfere with each other.

However, even when the magnetic head devices H1 and H2 are placed as shown in FIG. 1, the magnetic head devices H1 and H2 become a noise source against each other if each of the magnetic head devices H1 and H2 are adjusted to perform recording/reading in arbitrary timing. As a result, a phenomenon is occurred that one disturbs the test of reading by the other.

Figure 4:
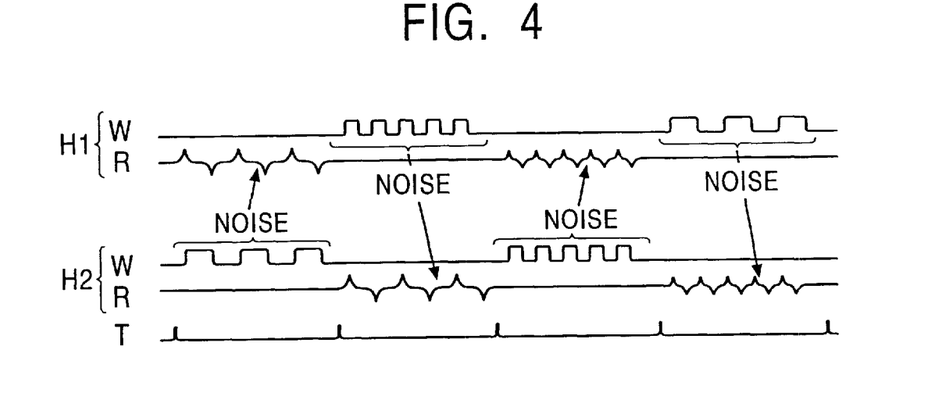
FIG. 4 is a timing diagram where two magnetic head devices are adjusted to record/read in arbitrary timing.

FIG. 4 shows timing diagrams for a timing signal T, which instructs timing of recording or reading to a write signal W, a read signal R and the magnetic head devices H1 and H2 when each of the magnetic head devices H1 and H2 is adjusted to perform recording/reading in arbitrary timing. In FIG. 4, a timing diagram referred to, as H1 is a timing diagram for the magnetic head device H1. A timing diagram referred to as H2 is a timing diagram for the magnetic head device H2.

Recording and reading are performed in synchronization with the timing signal T. The timing signal T is generated from the same generating source. However, in FIG. 4, a state is found that, simultaneously, one magnetic head device is performing a recording operation while the other magnetic head device is operating a reading operation. One magnetic head causes a high frequency noise while it is performing a recording operation. The noise reaches to the other magnetic head device, which is operating a reading operation, through the recording medium 24, and interferes with the accurate reading test.

According to the present invention, each of the magnetic head devices is adjusted to perform recording/reading alternately or simultaneously in order to prevent the plurality of magnetic head devices from becoming the noise source against each other.

Figure 2:
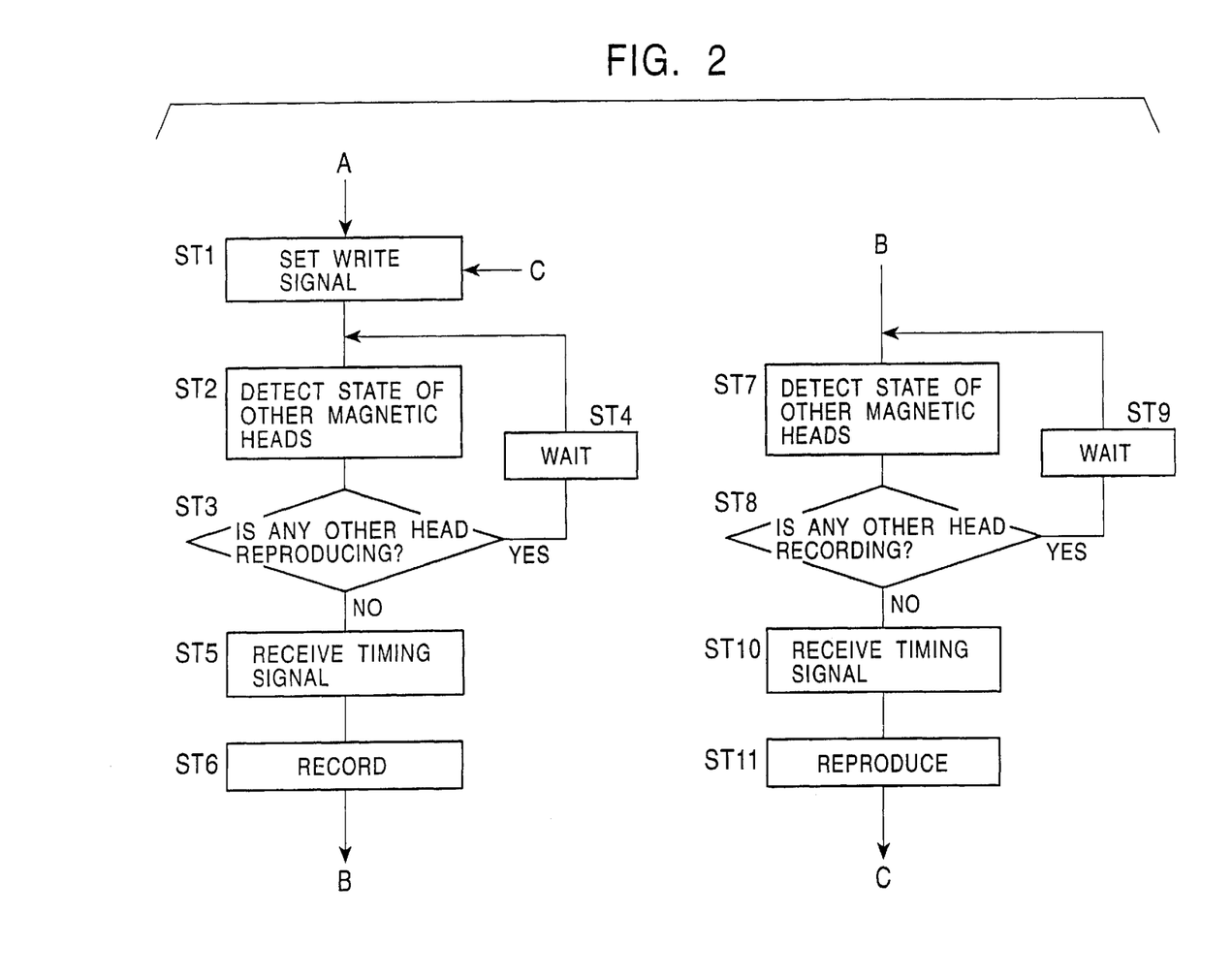
FIG. 2 is a first flowchart showing an embodiment of the present invention.

FIG. 2 is a flowchart showing a method for causing each of the magnetic head devices to perform recording/reading alternately when the magnetic head devices H1 and H2 are placed as shown in FIG. 1.

First of all, in step 1 (ST 1), it is determined which of the magnetic head device H1 or H2 is adjusted to perform a recording operation. Then, various conditions are set such as frequency and current of a write signal to be recorded. For example, it is assumed that the magnetic head device H1 is determined to perform recording.

Next, it is detected whether other magnetic head devices are performing a recording operation, a reading operation or being on standby (ST 2). Here, the state of the magnetic head device H2 is detected.

In ST 3, it is determined whether the magnetic head device H2 is performing a reading operation or not. If the magnetic head device H2 is operating a reading operation, the magnetic head device H1 is adjusted to wait (ST 4), and the magnetic head device H1 is put on standby. ST2–ST4 are repeatedly until the reading operation by the magnetic head device H2 is completed.

When it is determined that the magnetic head device H2 is not performing a reading operation, a timing signal is received (ST 5). The magnetic head device H1 is adjusted to perform a recording operation in synchronization with the timing signal, and the write signal is recorded on the recording medium 24 shown in FIG. 1 (ST 6).

Next, the magnetic head device H1 is adjusted to read the recorded write signal.

When the magnetic head device H1 is adjusted to perform a reading operation, it is detected whether other magnetic head devices are performing a recording operation, a reading operation, or being on standby (ST 7). Here, the state of the magnetic head device H2 is detected.

In ST 8, it is determined whether the magnetic head device H2 is performing a recording operation or not. If the magnetic head device H2 is recording, the magnetic head device H1 is adjusted to wait (ST 9), and the magnetic head device H1 is put on standby. ST 7–ST 9 are repeated until the recording operation by the magnetic head device H2 is completed.

When it is determined that the magnetic head device H2 is not performing a recording operation, a timing signal is received (ST 10). The magnetic head device H1 is adjusted to perform a reading operation in synchronization with the timing signal (ST 11). A size of the output and instabilities of the waveform (displacement of pulse width, leading edge width, asymmetry, etc.) of the read signal are tested and it is determined whether the quality of the magnetic head device H1 reaches to a standard or not.

Figure 5:
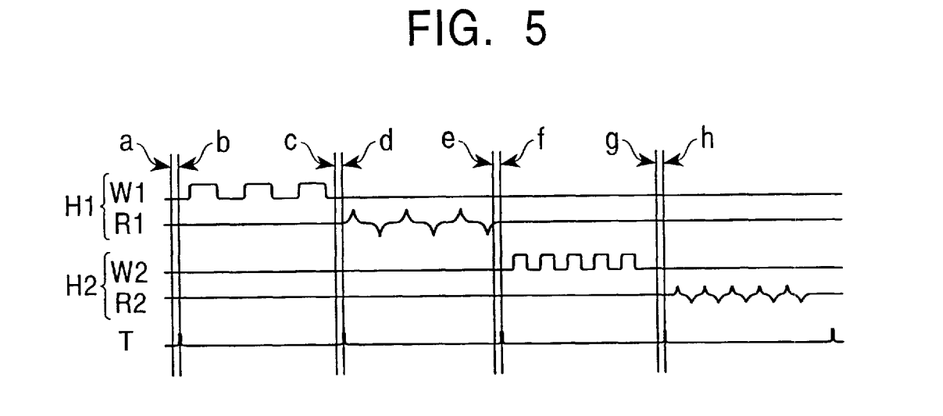
FIG. 5 is a timing diagram where two magnetic head devices are adjusted to record/read by following the first flowchart in FIG. 2.

FIG. 5 is one example of the timing diagram where the magnetic head devices H1 and H2 are adjusted to perform recording/reading by following the flowchart in FIG. 2.

In FIG. 5, first of all, a write signal to be recorded is set in the magnetic head device H1 (ST 1 in FIG. 2), and a state of the magnetic head device H2 is detected in timing a (ST 2). In the timing a, it is determined that the magnetic head device H2 is not performing a reading operation (ST 3), and the next timing signal T is received (ST 5). In synchronization with the timing signal T, that is, in timing b, a recording operation is initiated, and a write signal W1 is output, which is recorded on the recording medium 24 (ST 6).

Next, the signal recorded on the recording medium 24 by the magnetic head device H1 is read by the magnetic head device H1. First, a state of the magnetic head device H2 is detected in timing c (ST 7). In the timing c, it is determined that the magnetic head device H2 is not performing a recording operation (ST 8), and a next timing signal T is received (ST 10). In synchronization with the timing signal T, that is, in timing d, a reading operation is initiated, and a read signal R1 is output (ST 11). A size of the output and instabilities of the waveform (displacement of pulse width, leading edge width, asymmetry, etc.) of the read signal R1 are tested and it is determined whether the quality of the magnetic head device H1 reaches to a standard or not.

On the other hand, the magnetic head device H2 is also adjusted to perform recording/reading. It is assumed that, when a write signal to be recorded by the magnetic head device H2 is set (ST 1 in FIG. 2) and the recording operation gets ready, the timing for detecting the magnetic head device H1 (ST 2) is the timing c, for example. As described above, in the timing c, the magnetic head device H1 also detects the state of the magnetic head device H2 and begins to prepare for a reading operation. Thus, in this case, it is determined such that the reading operation by the magnetic head device H1 takes precedence (ST 3) and the magnetic head device H2 is adjusted to wait (ST 4).

Repeatedly, the state of the magnetic head device H1 is detected. When it is determined that the magnetic head device H1 completes its reading operation in timing e, for example, a next timing signal T is received (ST 5). In synchronization with the timing signal T, that is, in timing f, a recording operation is initiated, and a read signal W2 is output, which is recorded on the recording medium 24 (ST 6).

Next, the signal recorded on the recording medium 24 by the magnetic head device H2 is read by the magnetic head device H2. First, a state of the magnetic head device H1 is detected in timing g (ST 7). In the timing g, it is determined that the magnetic head device H1 is not operating a recording operation (ST 8), and a next timing signal T is received (ST 10). In synchronization with the timing signal T, that is, in timing h, a reading operation is initiated, and a read signal R2 is output (ST 11). A size of the output and instabilities of the waveform (displacement of pulse width, leading edge width, asymmetry, etc.) of the read signal R2 are tested and it is determined whether the quality of the magnetic head device H2 reaches to a standard or not.

Figure 3:
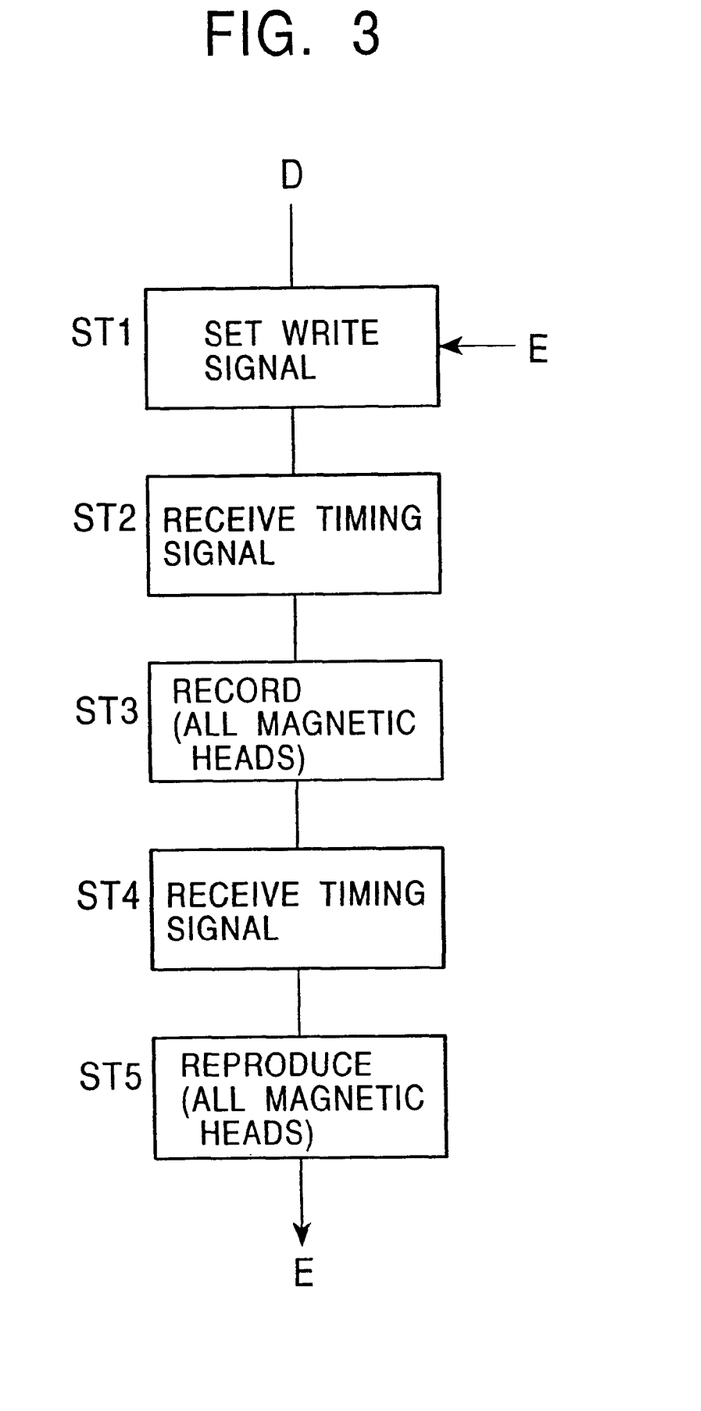
FIG. 3 is a second flowchart showing another embodiment of the present invention.

FIG. 3 is a flowchart showing a method for causing each of the magnetic head devices H1 and H2 to perform recording/reading simultaneously when the magnetic head devices H1 and H2 are places as shown in FIG. 1.

First of all, in step 1 (ST 1), it is determined the magnetic head devices H1 and H2 are adjusted to perform recording operations. Then, various conditions such as frequency and current of a write signal to be recorded are set.

Next, a timing signal is received (ST 2). In synchronization with the timing signal, the magnetic head devices H1 and H2 are adjusted to perform recording operations simultaneously to record a read signal on the recording medium 24 shown in FIG. 1 (ST 3).

Next, the magnetic head devices H1 and H2 are adjusted to read the recorded read signal.

Then, a timing signal is received (ST 4). In synchronization with the timing signal, the magnetic head device H1 and the magnetic head device H2 are also adjusted to perform reading operations simultaneously (ST 5). Sizes of the outputs and instabilities of waveforms (displacement of pulse width, leading edge width, asymmetry, etc.) of the read signals are tested and it is determined whether the quality of the magnetic head devices H1 and H2 reaches to a standard or not.

Figure 6:
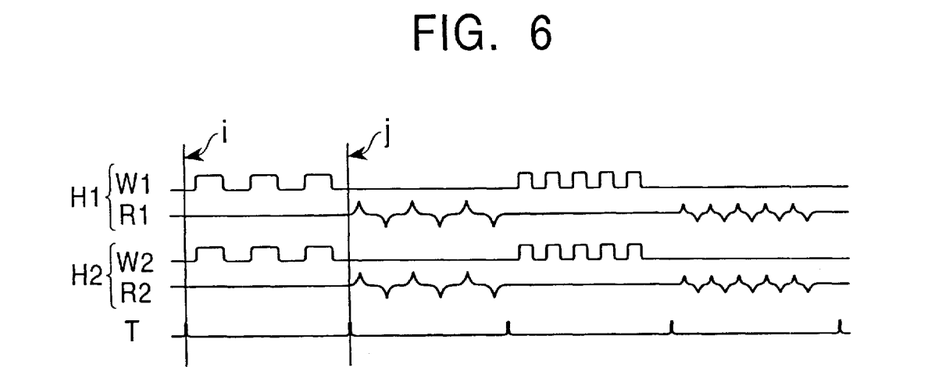
FIG. 6 is a timing diagram where two magnetic head devices are adjusted to record/read by following the second flowchart in FIG. 3.

FIG. 6 is one example of the timing diagram where the magnetic head devices H1 and H2 are adjusted to perform recording/reading by following the flowchart in FIG. 3.

In FIG. 6, a write signal to be recorded is set in the magnetic head devices H1 and H2 (ST 1 in FIG. 3), and a next timing signal T is received (ST 2). In synchronization with the timing signal T, that is, in timing i, the magnetic head devices H1 and H2 are adjusted to initiate recording operations and output write signals w1 and W2, respectively, which are recorded on the recording medium 24 (ST 3).

Next, the signals recorded on the recording medium 24 by the magnetic head devices H1 and H2 are read by the magnetic head devices H1 and H2.

After the recording operations are completed, a next timing signal T is received (ST 4). In synchronization with the timing signal T, that is, in timing h, the magnetic head devices H1 and H2 are adjusted to initiate a reading operation simultaneously and output read signals R1 and R2, respectively (ST 5). Sizes of the outputs and instabilities of the waveforms (displacement of pulse width, leading edge width, asymmetry, etc.) of the read signals R1 and R2 are tested and it is determined whether the quality of the magnetic head devices H1 and H2 reaches to a standard.

In FIG. 6, the test is repeated by changing a frequency of the write signal after one cycle of recording/reading is completed.

If the magnetic head devices H1 and H2 are adjusted to perform the recording/reading simultaneously by following the flowchart in FIG. 3, a need to adjust a wait is eliminated. Therefore, the testing time is shortened with compared to the method for adjusting them to perform recording/reading alternately by following the flowchart in FIG. 2.

Figure 7:
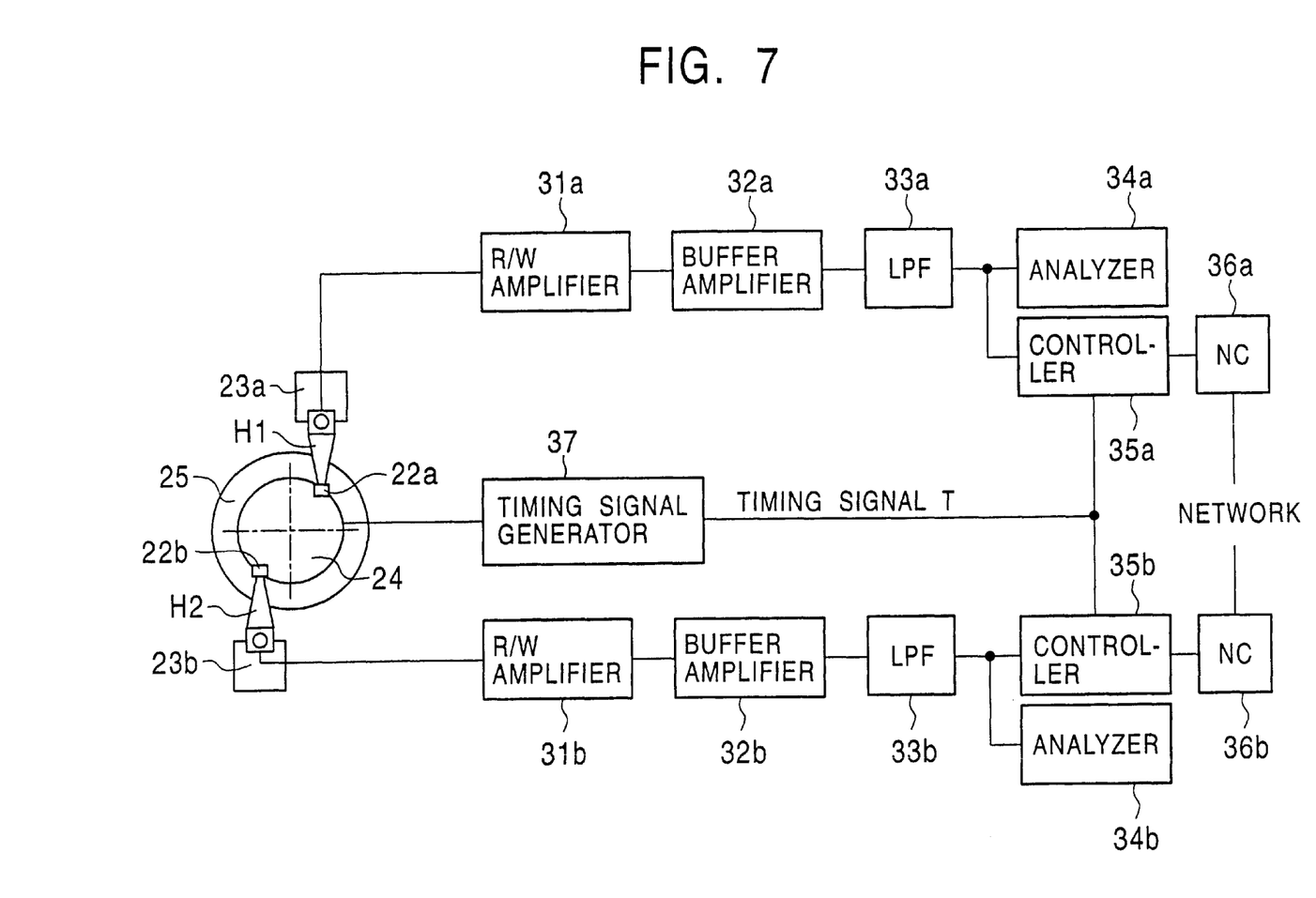
FIG. 7 is a block diagram showing an apparatus for testing a magnetic head device according to an embodiment the present invention.

FIG. 7 is a block diagram showing a testing apparatus for magnetic head device an embodiment of magnetic head device according an embodiment of to the present invention.

In FIG. 7, a driver 25 for turning a disk-shape recording medium 24 for the test is provided and a magnetic head devices H1 and H2 are held by holding portions 23a and 23b, respectively.

The magnetic head devices H1 and H2 are placed on the recording medium 24 by the holding portion 23a and the holding portion 23b, respectively, as shown in FIG. 1.

That is, a radial interval R2–R1 between scanning regions 26a and 26b, where recording function portions and reading function portions of the magnetic heads 22a and 22b scan the recording medium 24 is within about 1% of a reference radius r set in a radial middle 26 between the scanning regions 26a and 26b. Thus, conditions such as a relative traveling speed and a skew angle fall in the tolerance range of the test. Therefore, the magnetic head devices H1 and H2 are tested under virtually equal conditions.

Further, positions of the holding portions 23a and 23b are set such that the radial interval between scanning regions 26a and 26b where the recording function portions and the reading function portions of the magnetic heads 22a and 22b scan the recording medium 24 are spaced 200 μm. It can prevent that recording tracks formed on the recording medium 24 by each of the magnetic head devices H1 and H2 interfere with each other.

In the testing apparatus in FIG. 7, read/write amplifiers (R/W amplifiers) 31a and 31b function as a write signal generator for generating a write signal and outputting it to the recording function portions of the magnetic heads 22a and 22b of the magnetic head devices H1 and H2.

Further, controllers 35a and 35b instruct the R/W amplifiers 31a and 31b to generate a write signal and also instruct the reading function portions of the magnetic heads to read a write signal.

The recording/reading are instructed in synchronization with a timing signal T, which is sent at a certain interval from a timing signal generator 37 based on turning of a spindle motor provided in the driver.

The read signals sent from the reading function portions of the magnetic heads 22a and 22b are sent to analyzers 34a and 34b through the R/W amplifiers 31a and 31b, buffer amplifiers 32a and 32b, and LPF (low pass filters) 33a and 33b and analyzed. Then, the analyzers 34a and 34b test sizes of the outputs and instabilities of the waveforms (displacement of pulse width, leading edge width, asymmetry, etc.) of the read signals and determines whether the quality of the magnetic head devices H1 and H2 reaches to a standard or not.

The buffer amplifiers 32a and 32b are amplifiers for aiding the R/W amplifiers 31a and 31b. The LPFs (low pass filters) 33a and 33b remove noise of a signal sent/received by the analyzers 34a and 34b and controllers 35a and 35b.

In FIG. 7, the R/W amplifiers 31a and 31b, buffer amplifiers 32a and 32b, LPF 33a and 33b, analyzers 34a and 34b and controllers 35a and 35b are placed, respectively, for the magnetic head devices H1 and H2 facing onto the recording medium simultaneously.

Further, network computers (NC) 36a and 36b are connected to controllers 35a and 35b as a communication device monitoring each other such that the controllers 35a and 35b can instruct the magnetic head devices H1 and H2 to perform recording/reading alternately or simultaneously.

The controllers 35a and 35b can cause each of the magnetic head devices H1 and H2 placed on the recording medium simultaneously to self-record/read alternately. In that case, one magnetic head device of the magnetic head devices are adjusted to wait in order not to perform a reading operation, while the other magnetic head device is performing a recording operation on the recording medium 24.

Alternatively, the controllers 35a and 35b can cause each of the magnetic head devices H1 and H2 placed on the recording medium simultaneously to record/read simultaneously. In that case, the magnetic head devices are adjusted to perform recording operations simultaneously in synchronization with a same timing signal T, and, after write signals are recorded on the recording medium, magnetic head devices H1 and H2 are adjusted to perform reading operations simultaneously in synchronization with a same timing signal.

Figure 8:
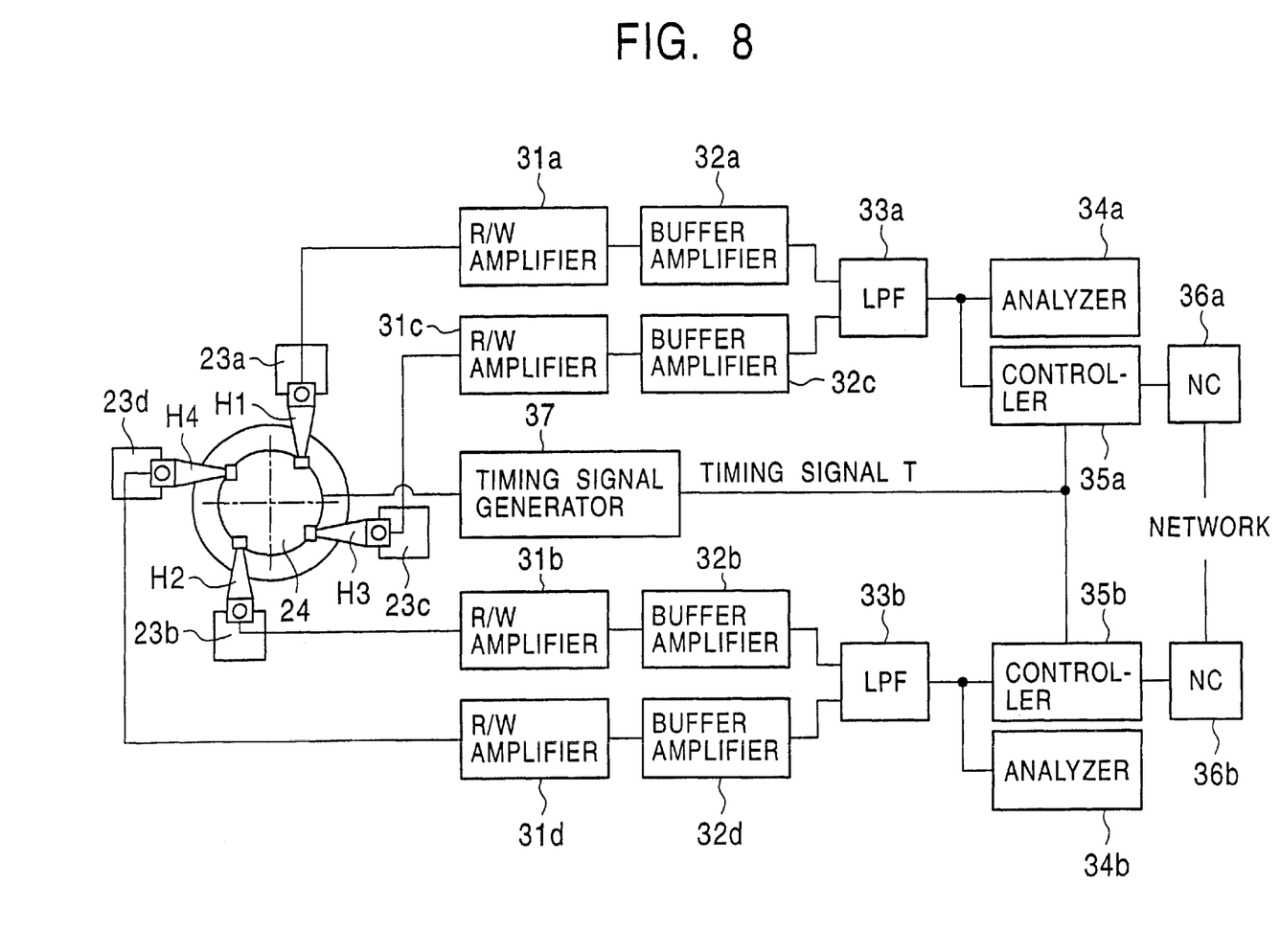
FIG. 8 is a block diagram showing a testing apparatus for a magnetic head device according to and the embodiment of the present invention.

FIG. 8 is a block diagram showing a testing apparatus for a magnetic head device according to another embodiment the present invention.

In FIG. 8, a total number of magnetic head devices to be tested on the recording medium 24 simultaneously is not more than two. However, four holding portions are provided for magnetic head devices including holding portions 23a, 23b, 23c and 23d.

Therefore, when magnetic head devices H1 and H2 provided on the recording medium 24 simultaneously are tested simultaneously, magnetic head devices H3 and H4, which are not under test, are removed from holding portions 23c and 23d holding the magnetic head devices H3 and H4 to be exchanged with magnetic head devices to be tested next. Thus, since the testing apparatus does not have to stop for the exchange of magnetic head devices, the test of the magnetic head devices can be performed continuously. Accordingly, the testing efficiency is improved.

While R/W amplifiers 31a, 31b, 31c and 31d and buffer amplifiers 32a, 32b, 32c, and 32d are placed for magnetic head devices H1, H2, H3 and H4, respectively, the R/W amplifiers 31a and 31c may be put into one device so that it can be used by switching between the magnetic head devices H1 and H3. Similarly, the R/W amplifiers 31b and 31d may be put into one device.

Further, the buffer amplifiers 32a, 32c and 32b, 32d may be put into one device.

What is claimed is:

1. A method for testing a plurality of magnetic head devices wherein each magnetic head device has a supporting member and a magnetic head having a recording function portion and a read function portion at an end of the supporting member, the method comprising the steps of:

placing the plurality of magnetic head devices on different scanning regions of a disk-shaped recording medium in the radial direction, each scanning region being slightly displaced from the other scanning regions in the radial direction of the recording medium, wherein said displacement is within about 1% of a reference radius set in the radial middle of said plurality of scanning regions;

turning said disk-shaped recording medium;

recording a plurality of magnetic signals on a common surface of said recording medium; and reading the recorded magnetic signal through each of said plurality of magnetic head devices in order to evaluate each of said plurality of magnetic head devices simultaneously through said read signal.

2. A method for testing a plurality of magnetic head devices according to claim 1, further comprising the step of, when at least one magnetic head device among said plurality of magnetic head devices is performing a recording operation on said recording medium, adjusting the other magnetic head devices to delay performing a reading operation until the recording operation is completed.

3. A method for testing a plurality of magnetic head devices according to claim 1, further comprising the steps of adjusting all said plurality of magnetic head devices to perform recording operations simultaneously; and adjusting all of said magnetic head devices to perform reading operations simultaneously.

4. A method for testing a plurality of magnetic head devices according to claim 1, wherein an interval in the radial direction between scanning regions where said recording function portions and reading function portions of said plurality of magnetic head devices scan the recording medium is set to be spaced at about 100 $\mu$m or larger.

5. A method for testing a plurality of magnetic head devices according to claim 1, wherein a holding device to which the supporting member of said magnetic head device is mounted are provided by two or more times of the number of magnetic head devices to be tested simultaneously, and exchanging magnetic head devices in said other holding devices each of which does not hold a magnetic head under test while said recording medium is being turned to test said plurality of magnetic head devices.

6. An apparatus for testing a magnetic head device according to claim 1, wherein, while at least one magnetic head device among said plurality of magnetic head devices placed on the recording medium simultaneously is performing a recording operation on said recording medium, said controlling device places the other magnetic head devices on standby to not perform a reading operation.

7. An apparatus for testing a plurality of magnetic head devices, comprising:

a driving device to turn a disk-shaped recording medium for a test;

a plurality of holding devices, each holding device to hold a supporting member of the magnetic head device having a magnetic head with a recording function portion and reading function portion and a holding member for supporting the supporting member, wherein the plurality of holding devices places said plurality of magnetic head devices on different scanning regions in the radial direction of the disk-shaped recording medium, each scanning region being slightly displaced from the other scanning regions in the radial direction of the recording medium, wherein said displacement is within about 1% of a reference radius set in a radial middle of said plurality of scanning regions;

a write signal generating device to generate and output a write signal to said recording function portion of said magnetic head, wherein said recording function portion records a magnetic signal on a common surface of said recording medium;

a controlling device to instruct said write signal generating device to generate a write signal and to instruct said reading function portion of said magnetic head to read a write signal;

a timing generating device to generate a timing signal for synchronization of recording and reading; and an analyzing device to analyze a read signal sent from said reading function portion of said magnetic head to determine recording and reading characteristics of said magnetic head device, wherein said controlling device instructs individual magnetic head devices to record/read alternately or simultaneously in synchronization with said timing signal.

8. An apparatus for testing a plurality of magnetic head devices according to claim 7, wherein said write signal generating device, said controlling device and said analyzing device are placed one each for one of a plurality of magnetic head devices facing onto said recording medium simultaneously; and further comprising a communication device by which said controlling device monitors another controller mutually, wherein said controlling device instructs each of said magnetic head devices to record/read one of alternately and simultaneously.

9. An apparatus for testing a magnetic head device according to claim 7, wherein said controlling device adjusts all of said plurality of magnetic head devices placed on said recording medium simultaneously, the plurality of magnetic head devices to perform a recording operation simultaneously and to perform a reading operation simultaneously after said recording operation.

10. An apparatus for testing a magnetic head device according to claim 7, wherein a position of said holding device has a radial interval between scanning regions where said recording function portions and reading function portions of said plurality of magnetic head devices scan the recording medium spaced about 100 $\mu$m or larger.

11. An apparatus for testing a plurality of magnetic head devices according to claim 7, wherein, when said holding devices are provided by two or more times of the number of magnetic heads to be tested simultaneously, and while the recording medium is being turned to test said plurality of magnetic head devices, exchanging magnetic head devices can be performed in other said holding device which does not hold the magnetic head under test.

* * * * *